(12) United States Patent
Moraru et al.

(10) Patent No.: US 10,015,788 B2
(45) Date of Patent: Jul. 3, 2018

(54) SYSTEM AND METHOD OF SIGNALLING FOR POINT-TO-MULTIPOINT (PTMP) TRANSMISSION IN FIXED WIRELESS BACKHAUL NETWORKS

(71) Applicant: BLiNQ WIRELESS INC., Kanata (CA)

(72) Inventors: Alexandru Moraru, Toronto (CA); Ho Ting Cheng, Stittsville (CA); Radu Bogdan Selea, Vaughan (CA)

(73) Assignee: BLiNQ Wireless Inc., Kanata (CA)

( * ) Notice: Subject to any disclaimer, the term of this patent is extended or adjusted under 35 U.S.C. 154(b) by 480 days.

(21) Appl. No.: 14/643,022

(22) Filed: Mar. 10, 2015

(65) Prior Publication Data

US 2015/0305025 A1 Oct. 22, 2015

Related U.S. Application Data

(63) Continuation-in-part of application No. 14/255,068, filed on Apr. 17, 2014, now Pat. No. 9,338,672.

(51) Int. Cl.

| | |
|---|---|
| H04W 72/04 | (2009.01) |
| H04L 5/14 | (2006.01) |
| H04L 27/26 | (2006.01) |
| H04W 28/06 | (2009.01) |
| H04B 7/06 | (2006.01) |

(52) U.S. Cl.
CPC ........... H04W 72/0446 (2013.01); H04L 5/14 (2013.01); H04L 27/2602 (2013.01); H04B 7/0617 (2013.01); H04W 28/06 (2013.01)

(58) Field of Classification Search
CPC .... H04W 72/0446; H04W 28/06; H04L 5/14; H04L 27/2602; H04L 47/365; H04B 7/0617

See application file for complete search history.

(56) References Cited

U.S. PATENT DOCUMENTS

| | | | |
|---|---|---|---|
| 2005/0135403 A1* | 6/2005 | Ketchum | H04L 29/06 370/437 |
| 2008/0159202 A1* | 7/2008 | Hang | H04W 56/001 370/324 |
| 2009/0161528 A1* | 6/2009 | Vaidya | H04L 27/2608 370/203 |
| 2012/0044833 A1* | 2/2012 | Lee | H04L 5/0007 370/254 |

(Continued)

*Primary Examiner* — Mandish Randhawa
(74) *Attorney, Agent, or Firm* — de Wilton Intellectual Property Inc.

(57) ABSTRACT

Systems and methods are disclosed for signaling in a point-to-multi-point (PtMP) fixed wireless backhaul network, in which each Hub serves a plurality of Remote Backhaul Modules (RBM). A Hub serves one RBM in each subframe per carrier in TDMA fashion, comprising transmitting a 1 ms TDD frame comprising one DL subframe and one UL subframe and gaps necessary to switch the radio direction and accommodate round trip delay. DL and UL frames may be allocated to different RBMs, with a single RBM in each DL or UL subframe per carrier per antenna beam. Each Hub keeps an independent context for each of its served RBMs. A DL ranging frame carries general information. A UL ranging frame carries a ranging opportunity. RBMs not scheduled in the current timeslot continue to receive a PHY control channel from the serving Hub, and update their parameters or links for link adaptation.

15 Claims, 4 Drawing Sheets

(56) References Cited

U.S. PATENT DOCUMENTS

| | | | | |
|---|---|---|---|---|
| 2012/0269161 A1* | 10/2012 | Chin | ................... | H04B 7/2618 |
| | | | | 370/330 |
| 2012/0281648 A1* | 11/2012 | Dahrouj | .............. | H04W 52/243 |
| | | | | 370/329 |
| 2013/0260777 A1* | 10/2013 | Gormley | ........... | H04W 72/0473 |
| | | | | 455/452.1 |
| 2015/0271723 A1* | 9/2015 | Yang | .................... | H04W 36/08 |
| | | | | 455/436 |
| 2017/0019218 A1* | 1/2017 | Sadeghi | ................. | H04L 5/001 |

\* cited by examiner

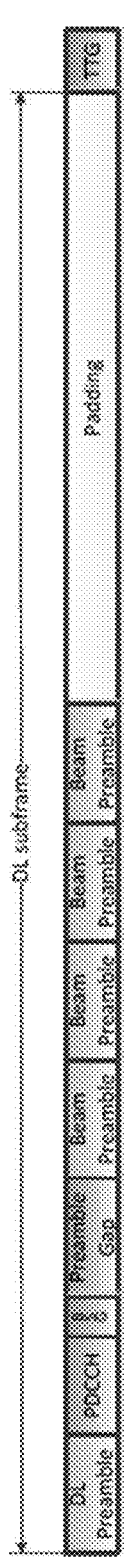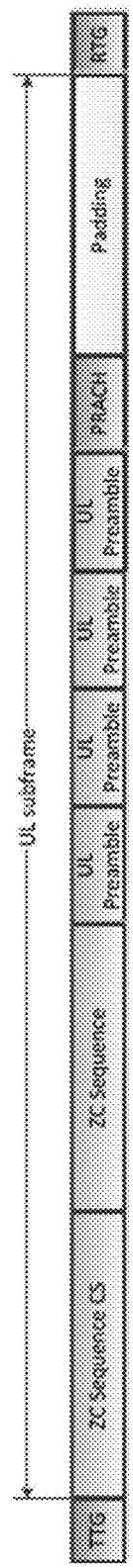
Fig. 3C
Fig. 3D

SYSTEM AND METHOD OF SIGNALLING FOR POINT-TO-MULTIPOINT (PTMP) TRANSMISSION IN FIXED WIRELESS BACKHAUL NETWORKS

CROSS-REFERENCE TO RELATED APPLICATIONS

This application claims priority from U.S. patent application Ser. No. 14/255,068, entitled "System and Method for Coordinating Hub Beam Selection in Fixed Wireless Backhaul Networks", filed Apr. 17, 2014 which is incorporated herein by reference in its entirety; and this application is related to U.S. patent application Ser. No. 14/314,996, entitled "System and Method for Reception Mode Selection in Dual-Carrier Wireless Backhaul Networks", filed Jun. 25, 2014, which is incorporated herein by reference in its entirety.

TECHNICAL FIELD

The present invention relates generally to telecommunications service network technology for wireless backhaul, and particularly to system and methods of signalling, including frame structures, for Point-to-Point (PtP) and Point-to-Multipoint (PtMP) transmissions in fixed wireless backhaul networks.

BACKGROUND

Wireless backhaul networks are deployed to carry the traffic between a wireless access network and the core network. For example, a wireless backhaul network may comprise a plurality of hubs, each connected to the wired core network via Ethernet. Each hub serves multiple Remote Backhaul Modules (RBMs), in a Point-to-Multipoint (PtMP) or Point-to-Point (PtP) configuration, using a wireless channel. Each RBM is deployed close to an access network base station, such as a small cell base station, and connected to the base station via a cable. The hubs are deployed at the locations where wired high capacity access to the core network is available, e.g. at a fiber point-of-presence.

In a wireless backhaul network, the term cluster refers to a number of RBMs and their respective serving hub. Performance of an RBM such as throughput is contingent upon its received Carrier-to-Interference-plus-Noise Ratio (CINR) and the amount of bandwidth allocated to this RBM given a selected carrier. The received signal strength of an RBM is determined by the transmit power of its serving hub and the pathloss between the serving hub and the RBM. The received interference-plus-noise level of an RBM is determined by the transmit powers of all the interfering hubs and the pathlosses between interfering hubs and the RBM. An RBM is affected by an interfering hub when a desired signal and an interfering signal are transmitted over the same carrier frequency.

Such a network typically operates in an interference rich environment. Interference may arise from co-channel or intra-link interference between radio links within the backhaul network. Additionally, there will be co-channel interference from other networks, i.e. inter-network interference.

In orthogonal frequency division multiple access (OFDMA) wireless networks, the frequency resources are divided into subcarriers or tones. In frequency reuse of 1 multi-sector deployment, network performance such as throughput, fairness and coverage in an interference-limited radio environment may be mitigated by techniques such as disclosed in the current Applicant's above-referenced related patents and patent applications.

Various different frame structures and/or signalling methods are known for operation of wireless networks using Point-to-Point (PtP) transmission and Point-to-Multipoint (PtMP) transmission. For application to fixed wireless backhaul networks, classic PtMP frame structures, as used conventionally for access networks using WiFi, LTE or WiMAx standards, have issues with overhead, latency and scalability. Thus, there is a need for novel frame structures and signalling methods to facilitate Point-to-Multipoint (PtMP) transmission in wireless backhaul networks.

An object of the present invention is to provide an improved or alternative method and system for signalling to enable Point-to-Multipoint (PtMP) transmission in a wireless backhaul network, and particularly for wireless backhaul networks comprising fixed or stationary nodes with directional antennas, including small cell Non-Line-Of-Sight (NLOS) backhaul networks.

SUMMARY OF INVENTION

The present invention seeks to eliminate, or at least mitigate, disadvantages of known systems and methods, or at least provide an alternative.

Aspects of the invention provide a system and method of signaling for Point-to-Multipoint (PtMP) transmission in a fixed wireless backhaul network. The method comprises operating the wireless backhaul network in a TDD (Time Division Duplex) Point-to-Point (PtP) system in a time sliced mode, i.e. a switched Point-to-Multipoint (PtMP) mode. Embodiments are disclosed using special frame structures, signalling mechanisms, algorithms and state machines, to enable wireless backhaul communication with low overhead and low latency.

A first aspect of the invention provides a method of signaling for Point-to-Multi-Point (PtMP) transmission in a fixed wireless backhaul network comprising a plurality of Hub Modules (HM) and Remote Backhaul Modules (RBM) having directional antenna and deployed as fixed nodes, wherein each hub site comprises at least one HM, and each HM serves a set of the RBMs through hub-RBM radio links, and wherein for PtMP transmission each Hub Module serves one RBM in each resource slot in TDMA mode, comprising: in each resource slot, transmitting a TDD frame comprising one DL subframe (hub transmits), one UL subframe (RBM transmits) and gaps necessary to switch the radio RX/TX direction and accommodate a round-trip delay; and wherein each subframe carries a control channel that describes that subframe and specifies one destination RBM for the DL subframe and one source RBM for the UL subframe.

Since the control channel for each DL and UL subframe completely describes the subframe and specifies the source/destination RBM, no other "frame map" type information is needed.

In an embodiment, resource slot, or timeslot, comprises a 1 ms TDD frame. The DL and UL subframes of the TDD frame in one resource slot may be allocated to different RBMs. Each hub may serve a single RBM in each DL subframe per carrier, and per antenna beam. Each hub may serve a single RBM in each UL subframe per carrier and per antenna beam.

The method further comprises, for ranging, transmitting a ranging frame. This is a "special" frame or time slice that is periodically allocated for ranging requests, i.e. a frame wherein the DL subframe carries general information and the UL subframe carries a ranging opportunity. The ranging frame is periodically allocated for ranging requests. A hub can decide to allocate this special frame for contention (any new RBM can transmit) or for unicast source (only a specific RBM can send).

The DL subframe can have no destination RBM; this particular DL subframe contains information for RBMs trying to join.

Each HM stores an independent context for each of its served RBMs, e.g. a record with the operational state and performance of each RBM, for efficient switched PtMP transmissions. RBMs not scheduled in the current resource slot continue to receive PHY control channel signaling from their serving HM, and RBMs update their parameters or links accordingly. Also, RBMs not scheduled in the current resource slot monitor their RF environments and update their parameters or states accordingly, e.g. to allow for link adaptation.

Other aspects of the invention provide a system comprising a fixed wireless backhaul network configured for implementing methods disclosed herein. Also provided is a computer readable storage medium storing reported data and storing programming instructions for execution by one or more processing units of a fixed wireless backhaul network comprising a plurality of nodes, wherein each node comprises at least one hub module, and each hub module serves one or more remote backhaul modules (RBMs) through hub-RBM radio links, said programming instructions implementing, in one or more of said processing units, a method as described herein.

Advantageously, methods and systems according to exemplary embodiments of the invention are designed to work reliably in an interference rich scenario. Thus, the frame structure is designed for improved and autonomous Hub-RBM link control, allowing for joint scheduling, coordinated power control, beam-forming, and MIMO techniques, such as precoding. At the same time, frame structure provides flexibility for QoS-aware implementation.

Beneficially, methods according to exemplary embodiments provide reduced overhead and latency.

Thus, an improved or alternative system and method is provided for signalling in Point-to-Multipoint (PtMP) transmission in a wireless backhaul network is provided, with particular application for wireless backhaul networks comprising fixed or stationary nodes with directional antennas, including small cell Non-Line-Of-Sight (NLOS) backhaul networks.

The foregoing and other objects, features, aspects and advantages of the present invention will become more apparent from the following detailed description, taken in conjunction with the accompanying drawings, of preferred embodiments of the invention, which description is by way of example only.

BRIEF DESCRIPTION OF THE DRAWINGS

FIG. 3C shows a beam selection downlink subframe; and

FIG. 3D shows a ranging uplink subframe.

DESCRIPTION OF EMBODIMENTS

A system and method for signalling for PtMP transmission in a wireless backhaul network according to an embodiment of the present invention will be described, by way of example, with reference to a NLOS wireless backhaul network 100 as illustrated schematically in FIG. 1, which represents schematically the topology of a system comprising a Point-to-Point wireless backhaul network, comprising a plurality of fixed nodes, which may be operated for Point-to-Multipoint transmission using a method of an embodiment comprising switched Point-to-Multipoint (switched PtMP) transmission. The nodes comprise a plurality of hubs 102 and RBMs 104.

Figure 1:
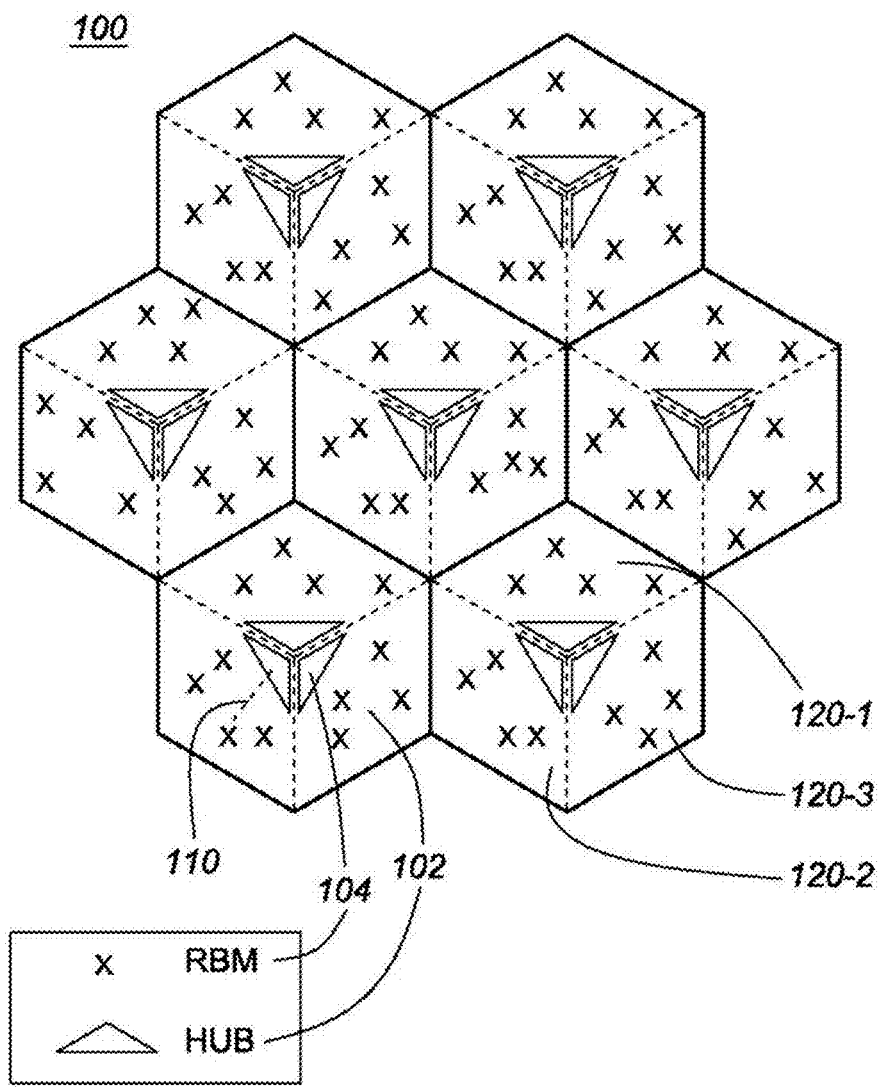
FIG. 1 shows a schematic diagram representing a wireless backhaul network comprising a plurality of hubs, each hub serving a plurality of Remote Backhaul Modules (RBMs) for implementing a method for signalling for Point-to-Multipoint (PtMP) transmission in a wireless backhaul network according to an embodiment of the present invention.

As an example only, the wireless backhaul network 100 shown in FIG. 1 comprises a plurality of seven sites or cells, each site comprising three hub modules 102, with each hub module serving a sector 120 comprising a cluster of a plurality of Remote Backhaul Modules (RBMs) 104. Thus, there are 21 sectors, each with a hub module 102, serving a cluster of up to four RBMs. As shown, three hubs modules 102, each with directional antenna, are co-located in each of the cell centers, with a cluster of RBMs mapped to each respective serving hub module in each of the three sectors 120-1, 120-2 and 120-3 of the cell.

Figure 2:
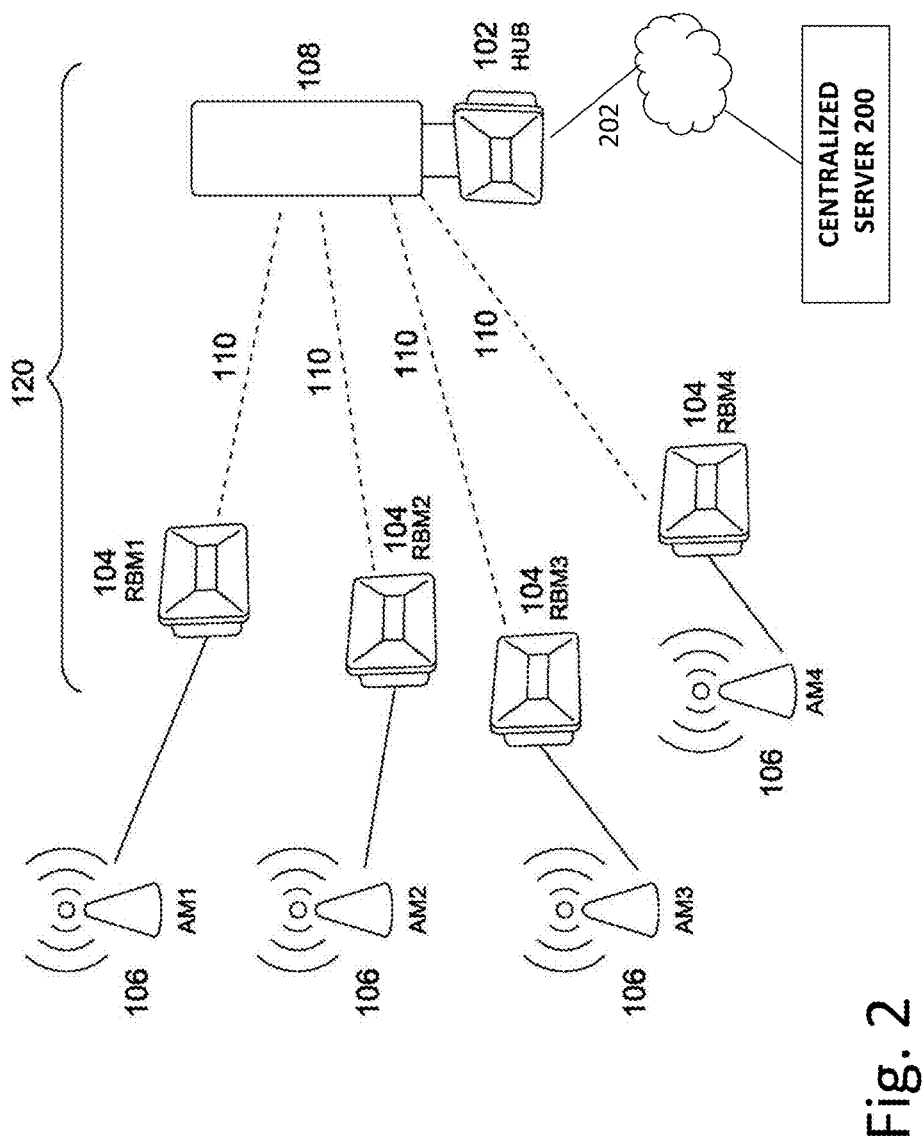
FIG. 2 shows a schematic diagram of representing the architecture of part of the wireless backhaul network comprising one cluster of four RBMs served by a Hub Module, each RBM being connected to an access module of an access network, and wherein the hub has a connection to a centralized control server.

In each sector 120, a hub 102 serves its set or cluster of Remote Backhaul Modules (RBMs) 104 through wireless links, i.e. hub-RBM radio links 110, as shown schematically in FIG. 2. Each RBM 104 communicates with and is co-located with an Access Module (AM) 108 of an access network, such as a small cell-base station, using a wired connection, e.g. an Ethernet cable. The hub module 102 may have a multi-beam antenna 108 and RBMs 104 each have an integrated directional antenna that is directed towards the hub. Unlike a multi-hop architecture, each link 110 comprises only one hop from each RBM 104 to a respective hub to carry the traffic. It is also different from the relay system where the access links and relay links share the same radio frequency band. The backhaul network operates at a different frequency band from that of the access network. Also shown in FIG. 2 is a communications link 202 from the hub 102 to a centralized server or controller 200, for managing control functions of the wireless backhaul network.

The system provides suitable communications interfaces and links between the centralized server and the hubs for sending and receiving control messages and data for implementing network control functions. As described in the Applicant's U.S. Pat. No. 8,824,311, entitled "System and Method for Co-Channel Interference Measurement and Managed Adaptive Resource Allocation for Wireless Backhaul", the centralized server may, for example, function as a server for Managed Adaptive Resource Allocation (MARA) and performing Radio Frequency Environment Characteristic (RFEC) measurements for characterizing each Hub-RBM link of the network.

As described herein, a novel frame structure provides for operation of the wireless backhaul network in a TDD Point-to-Point (PtP) system in a time sliced mode, i.e. a switched Point-to-Multipoint (PtMP) mode, for reduced overhead and latency. This frame structure also provides other advantages described below.

Frame Structure

The TDD frame structure used for uplink and downlink transmissions, according to embodiments of the invention, is shown in FIGS. 3A to 3D. Each resource slot or frame is 1 ms long and comprises a number of symbols, where the exact number of samples is a function of sampling frequency. The TDD frame is divided into a DL subframe (Hub transmits) and a UL subframe (RBM transmits). The DL and UL subframes are separated by two gaps: a transmit termination gap (TTG) and a receive termination gap (RTG). The gaps allow the radios to switch between transmission and receive (TX/RX) and the gaps account for the round trip delay.

Figure 3A:
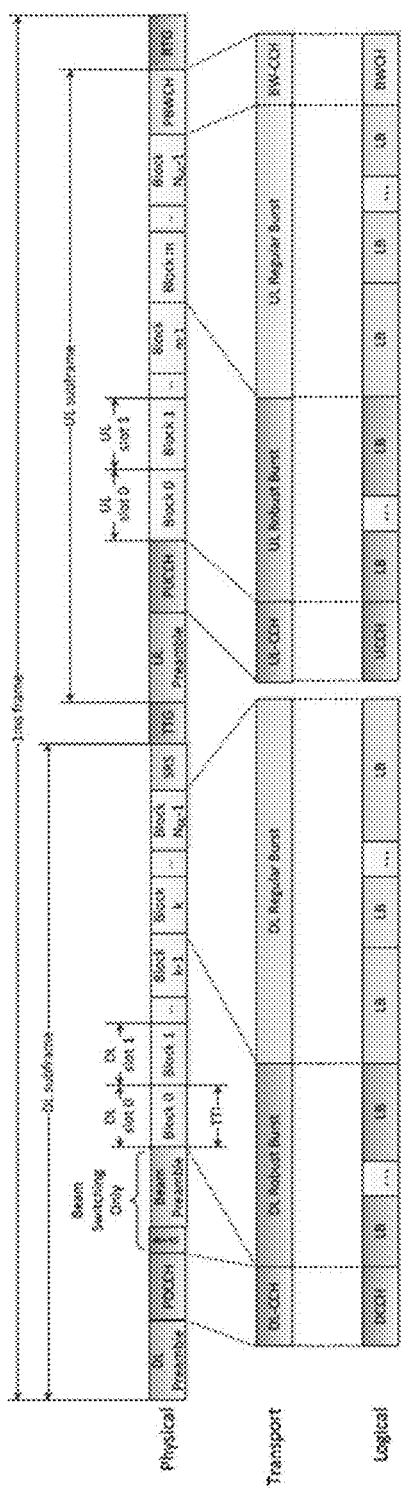
FIG. 3A shows schematically a frame structure for implementing a system and method for signalling for PtMP transmission in a wireless backhaul network according to an embodiment of the present invention.
Figure 3B:
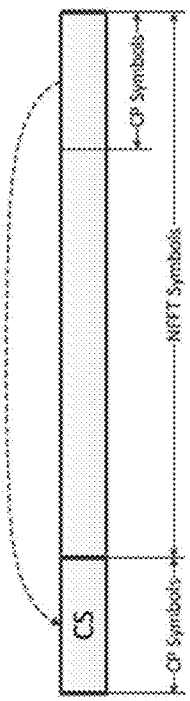
FIG. 3B shows schematically a FDE block with cyclic prefix.

The DL subframe starts with a channel estimation preamble sequence transmitted on both streams (MIMO), followed by a physical control channel sequence transmitted in SIMO mode. If switching to a particular Hub antenna beam is required, the frame continues with a Beam Switch Gap (BSG) and a channel estimation preamble called Beam Preamble. The subframe continues then with the FDE-blocks allocated to the physical DL shared channel. Each preamble, control channel or FDE-block is attached a cyclic prefix as shown in FIG. 3B.

The frame is further divided into slots (or mini-frames) which constitute the MAC/PHY data plane interface. The MAC provides a Transport Block (TB) to be transmitted in every slot. In this implementation a slot contains a single FDE-block.

Only for the DL subframe, a set of slots at the end of the subframe can be dedicated to the Sounding Reference Signal (SRS) transmission. These slots are not taken into account in the transport level bursts defined below. The SRS measurements are used by MARA.

The Beam preamble sequence transmitted is identical to the DL preamble. The preamble sequence can be different from one frame to another. Each Hub is pre-assigned and fixed to a Preamble Index Phase, i.e. the preamble index to be used in the frame following the 1 pps pulse. This way, network planning can make sure that neighbouring Hubs do not use the same preamble sequence simultaneously.

Beam Sounding Subframe

A special DL subframe used for Hub antenna beam selection is transmitted for each beam on a special frame called Beam Sounding Subframe (BSS), allowing the RBM to train the equalizer. The Beam Sounding Subframe carries no payload data. The structure of the DL Beam Sounding Subframe is shown in FIG. 3C. Hub beam selection is described in more detail in the above referenced related U.S. patent application Ser. No. 14/255,068, entitled "System and Method for Coordinating Hub Beam Selection in Fixed Wireless Backhaul Networks".

The Beam Sounding Subframe does not transmit the Beam Preamble and extends the Beam Switch Gap with a Preamble Gap. This is to avoid the sounding subframe being interfered with by neighbour Hubs transmitting their Beam Preamble. The payload of the subframe comprises a sequence of four channel estimation preambles to be used by the RBM to rank the beam. The remainder of the frame is padded with zero symbols.

The UL subframe starts with a 256 symbol preamble sequence, (different in size and structure in RACH frames) followed by a 128 symbol Physical Control Channel (PUCCH) and by FDE blocks allocated to the UL physical shared channel. The subframe is divided into slots equal to one FDE block used for transport blocks sent by the RBM.

The UL preamble sequence is different from all the sequences that can be used for DL preamble.

Another Hub antenna beam switch can take place during TTG in case the RBM transmitting during the UL subframe is not the same addressed by the DL subframe.

The last slot of certain UL subframes can be dedicated to transport a control channel that can be allocated either to an RBM (unicast access) or to all (random access) with the sole purpose of requesting bandwidth outside their scheduled unicast control channel. This special slot is shown as BWR in FIG. 3A. The BWR channel comprises a channel estimation preamble transmitted in MIMO mode followed by a physical transport channel (PBWCH) transmitted in SIMO mode and some symbols of silence.

Ranging UL Subframe

A special UL subframe used for ranging starts with a ranging preamble (a ZC sequence and its cyclic prefix) followed by four channel estimation preambles and a control channel (PRACH). See FIG. 3D.

The slot sets in both DL and UL subframes can be grouped in two bursts, transmitted with either the same or different modulations, or the same or different antenna methods. The first burst of the subframe may be transmitted with a more robust MCS than the subsequent bursts, allowing some logical channels (like unicast MAC control) to be sent with a higher degree of reliability. It is ultimately the decision of the Layer 2 to transmit one or two bursts per subframe and to schedule certain logical channels to the more robust burst. Depending on the MCS used, the two bursts are designated "robust" and "regular".

The logical channel data scheduled to be transmitted in the current subframe is grouped into a Logical Block (LB) corresponding to a set of consecutive TBs. Two LBs can share the same TB, but no LB can cross the burst boundary. Each burst will transport one or more LBs.

Frame Type

The system uses two types of frame, depending on the physical channels carried and the intended destination of transmission: broadcast frames and unicast frames. The type of the frame is indicated by the Downlink Control Channel (DCCH). The Physical Downlink Control Channel (PDCCH) is part of all frames, regardless of type Broadcast Frames The broadcast frames carry the Physical Downlink Broadcast Chanel (PDBCH) in the DL subframe and the Physical Uplink Ranging Channel (PURACH) in the UL subframe.

At logical level, the broadcast frame is used by the Hub to transmit all relevant information needed by an RBM to attempt network entry (e.g. Hub Id, DL/UL ratio). The Hub also uses this channel to send ranging response to RBMs attempting initial ranging.

The UL subframe of the broadcast frame is used as initial ranging opportunity or ranging request opportunity. The subframe format is shown in FIG. 3D.

In a PtP or PtMP system the Hub will transmit only broadcast frames until an RBM finishes initial ranging and registers. In a PtMP system with RBMs registered, the broadcast frames are sent periodically, less frequently, allowing new RBMs to start initial ranging. The frequency of broadcasting of these frames can be temporarily increased for the duration that a new RBM performs the initial ranging. After a restart, the Hub can keep transmitting broadcast frames at a higher rate for a short period of time allowing RBMs previously camped there to re-register faster.

Antenna Beam Selection Frames

These are unicast frames used for DL and UL subframes the special format shown in FIG. 3C and FIG. 3D. These frames are used in unicast mode to determine the beam to be used with an RBM that just joined the network. An antenna beam selection frame is used for each beam. This special frame is used to train the equalizer and estimate the channel using a number of preambles transmitted in each direction. Measurements are stored for each beam and used in the end to make a decision on the beam to use with the respective RBM. Once decided, the RBM beam selection is persistent, that is, it does not have to be communicated via the control channel.

Unicast Frames

Unicast frames are used for communication with a single RBM per direction. In a PtMP system, the RBM(s) targeted by the unicast DL and UL subframe are indicated by the DL CCH.

The DL subframe of the unicast frame carries the Physical Downlink Shared Channel (PDSCH) while the Uplink subframe carries the Physical Uplink Shared Channel (PUSCH).

The UL subframe of a unicast frame may transport the bandwidth request opportunity channel in the last slot. This opportunity can be allocated by the Hub to a certain RBM (other than the one targeted by the subframe) or left open to random access for all RBM. The rationale behind this is to allow RBMs to request bandwidth sooner and also to drastically reduce the overhead in some situations (e.g. for RBMs with best-effort only service this avoids the need of Hub pooling by allocating an entire UL subframe only to find out that there's no data to send).

Application of the Frame Structure for PtMP with Reduced Overhead and Latency

The switched Point-to-Multipoint (PtMP) system described herein uses the frame structures described above for PtMP transmissions in fixed wireless backhaul networks with reduced overhead and latency. A TDD PtP system, e.g. as described in prior patent applications of the applicant, is modified for operation in a time-sliced mode, or so-called switched Point-to-Multipoint mode.

A HM serves one RBM in each resource slot (i.e., one timeslot per carrier) in TDMA fashion. The HM stores independent RBM contexts for efficient switched PtMP transmissions. The RBM context comprises a record of the operational state and performance of the RBM.

A time slice (frame) is allocated to each RBM; and each TDD frame has two subframes, one DL subframe and one UL subframe and the gaps necessary to switch the radio direction, i.e. including hardware duty cycle changes, and to accommodate the round trip delay. To increase flexibility, the DL slice and UL subframes or slices are not necessarily allocated to the same RBM. For instance, RBM-A can be assigned to the DL slice of frame-1, and RBM-B to the UL slice of frame-1.

Importantly, each subframe carries a control channel that completely describes that subframe and specifies the source/destination RBM. Thus, no other "frame map" type information is needed.

A "special" time slice or frame is periodically allocated for ranging requests. The Hub can decide to allocate this special frame for contention (any new RBM can transmit) or for unicast source (only a specific RBM can send).

The DL subframe can have no destination RBM; this particular DL subframe contains information for RBMs trying to join.

As an overall principle, embodiments of the systems and methods described herein are designed to work reliably in an interference rich scenario. The frame structure allows for improved autonomous RBM link control: i.e. for joint scheduling, coordinated power control, beam-formers and MIMO techniques, such as precoding. This frame structure also has flexibility to enable effective QoS-aware implementation.

In particular, application of this frame structure provides the following benefits:

Low DL Overhead

Each DL subframe is sent to one RBM only; otherwise we would have to contain the destination RBM(s), leading to signaling overhead.

Low UL Overhead

Having only a single source RBM avoids the need of multiple preambles (one for each RBM) and/or gaps in time.

No Need for Maps Transmitted by Hub

No DL and/or UL map is needed for a single source RBM in UL. A minimal Control Channel Information contains everything needed by the RBM to support low overhead and low latency communication.

Scalable Per-link Optimization

Having a single RBM as source or destination in any subframe allows the usage of distinct TX power and RX gain per each subframe; thus, we can optimize for either max MCS or interference mitigation. Different cyclic prefix values can be employed for different RBMs in the same cluster based on per-link power delay profile analysis; thus the spectral efficiency of each link can be optimized.

Facilitation Hub-beam Switching

Having a single source or destination RBM per subframe allows simple beam switching mechanism to be used to select the beam used to transmit to or receive from potentially different RBMs.

Scalable Frame Structure

The control channel can completely characterize each sub-frame (i.e., no map sent in DL is needed to describe the UL structure); each node deals with its own transmission as a PtP node.

Comparison with Classic PtMP Frame Structures

The disclosed frame structure helps to provide low latency and low overhead communication for a small number of remote terminals as opposed to classic PtMP frame structures.

This frame structure scales with the number of remotes in terms of overhead and latency as opposed to static PtMP frame structure (see LTE and/or WiMAX). Also this frame structure allows strong QoS and scheduling implementation as opposed to WiFi frame structure that is based on switched communication as well. The present frame structure allows for a fully synchronized solution as opposed to WiFi communication. In principle, the present frame structure allows synchronization with 4G LTE access networks. A slotted time division approach allows for future spectrum sharing and coexistence techniques like coordinated blanking and beam steering and power control.

Link-Level and System-Level Algorithms

The PtMP frame structure disclosed herein enables implementation of both link-level and system-level algorithms with low overhead. These may include, for example, one or more of the following:

ATPC (Automatic Transmit Power Control)

Each RBM runs independently of ATPC, e.g., different RBMs can have different RSSI or dBFS targets, depending on the link objective and network objective.

AGC (Automatic Gain Control)

Each hub module maintains a per-link AGC for each RBM to maximize the link and network performance, e.g., high AGC gain for power-limited RBMs.

Beam Selection

Each hub module maintains per-link beam selection for each RBM; beams can be switched from one frame to another frame, and from the DL subframe to the UL subframe in the same frame.

DL Power Control

Each hub module can run independent transmit power control for each RBM; joint power control and beam switching is effective in mitigating interference.

Precoding

Per-link RBM precoding.

Per-RBM scheduling and link adaptation so as to maximize the sum utility among its served RBMs.

System Level Coordination

Systems and methods using the frame structure disclosed herein also provide for coordinated beam selection, power control, carrier assignment, e.g. jointly decided and coordinated at the network level by a centralized server. This coordination may be implemented across the whole network, or across parts of the network, e.g. in a partitioned network.

Accordingly, the centralized server comprises a processing unit and data storage for storing network information, including data reported from the hub modules and RBM, and programming instructions for implementing methods described herein, including coordinating network functions and processes. The hub modules and RBMs at each node comprise respective processing units and data storage for storing reported data and programming instructions for implementing methods described herein.

Advantageously, methods and systems according to exemplary embodiments of the invention are designed to work reliably in an interference rich scenario. Thus, the frame structure is designed for improved and autonomous Hub-RBM link control, allowing for implementation of joint scheduling, coordinated power control, beam-forming, and MIMO techniques, such as precoding. At the same time, frame structure provides flexibility for QoS-aware implementation. For more information on systems and methods for implementing these processes, reference is made to the Applicant's related co-pending patent applications, which are incorporated herein by reference, in their entirety: U.S. patent application Ser. No. 13/463,478, entitled "Interference Mitigation with Scheduling and Dynamic Power Spectrum Allocation for Wireless Networks", filed May 3, 2012 claiming priority from U.S. Provisional patent applications No. 61/483,417, filed May 6, 2011 and No. 61/506,895, filed Jul. 12, 2011; U.S. patent application Ser. No. 14/314,878, entitled "Method and Apparatus for Precoding in a Two Transmit Antenna Closed-Loop MIMO Fixed Wireless Network", filed Jun. 14, 2014; U.S. patent application Ser. No. 14/255,068, entitled "System and Method for Coordinating Hub Beam Selection in Fixed Wireless Backhaul Networks ", filed Apr. 17, 2014; U.S. patent application Ser. No. 14/215,798, entitled "System and Method for Joint Scheduling in Dual-Carrier Wireless Backhaul Networks", filed Jun. 14, 2014; U.S. patent application Ser. No. 14/314,996, entitled "System and Method for Reception Mode Selection in Dual-Carrier Wireless Backhaul Networks", filed Jun. 25, 2014.

In summary, an improved system and method of signaling for PtMP transmission in a fixed wireless backhaul network is disclosed, using a novel frame structure. The lightweight signaling design scales well with the number of remote devices in terms of latency, while the signaling overhead is constant per frame.

TABLE 1

| Terminology | |
|---|---|
| Sample or Symbol | Complex number representing a single IQ (Quadrature) modulated data |
| FDE-block | A set of NFFT consecutive symbols on which frequency domain equalization (FDE) is performed |
| Slot or Mini-frame | A group of one or more FDE-blocks which define the basic transmission time interval (TTI) for the MAC/PHY data interface |
| Transport Block (TB) | A data plane unit that carries the payload for transmission of every mini-frame |
| Logical Block (LB) | A data plane unit that carries the payload of a logical channel to be sent during one subframe, transmitted using a set of consecutive Transmit Blocks |
| Burst | Set of consecutive TBs transmitted with the same MCS. A burst transmits one or more logical blocks. |

TABLE 2

| Abbreviations | |
|---|---|
| BCCH | Broadcast Control Channel |
| BSG | Beam switching gap |
| DCCH | Downlink Control Channel |
| FDE | Frequency Domain Equalization |
| LB | Logical Block |
| NFFT | Size of FFT |
| PDBCH | Physical Downlink Broadcast Channel |
| PDCP | Packet Data Convergence Protocol |
| PDSCH | Physical Downlink Shared Channel |
| PDU | Protocol Data Unit |
| PURACH | Physical Uplink Random Access Channel |
| PUSCH | Physical Uplink Shared Channel |
| RACH | Random Access Channel |
| RLC | Radio Link Control |
| RRC | Radio Resource Control |
| SRS | Sounding Reference Signal |
| TB | Transport Block |
| TTI | Transmission Time Interval |
| UCCH | Uplink Control Channel |
| UMCCH | Unicast MAC Control Channel |
| HM | Hub Module |
| RBM | Remote Backhaul Module |
| WiMAX | Worldwide Interoperability for Microwave Access (IEEE 802.16) |
| WiFi | Wireless (IEEE 802.11) |
| LTE | Long Term Evolution |
| TDD | Time Division Duplex |
| NLOS | Non Line of Sight |

TABLE 2-continued

Abbreviations

| | |
|---|---|
| OFDMA | Orthogonal Frequency Division Multiple Access |
| DL | Downlink |
| UL | Uplink |
| PHY | Physical Layer |
| MAC | Media Access Control |
| MIMO | Multiple Input Multiple Output |
| SIMO | Single Input Multiple Output |
| QoS | Quality of Service |
| TX | Transmit |
| RX | Receive |
| TTG | Transmit termination gap |
| RTG | Receive termination gap |
| MARA | Managed Adaptive Resource Allocation |
| BWR | BandWidth Request |
| AGC | Automatic Gain Control |
| ATPC | Automatic Transmit Power Control |
| TDMA | Time Division Multiple Access |
| RF | Radio Frequency |

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A method of signaling for Point-to-Multi-Point (PtMP) transmission in a fixed wireless backhaul network comprising a plurality of Hub Modules (HM) and Remote Backhaul Modules (RBM) having directional antenna and deployed as fixed nodes, wherein each hub site comprises at least one HM and each HM serves a set of the RBMs through hub-RBM radio links, and wherein for PtMP transmission, each HM serves one RBM in each resource slot in Time Division Multiple Access (TDMA) mode, comprising: in each resource slot, transmitting a Time Division Duplex (TDD) frame comprising one Downlink (DL) subframe wherein a HM transmits, one UpLink (UL) subframe wherein an RBM transmits, and gaps necessary to switch the radio receive/transmit (RX/TX) direction and accommodate a round-trip delay: and wherein each subframe carries a control channel that completely describes that subframe and specifies a single destination RBM for the DL subframe and a single source RBM for the UL subframe.

2. The method of claim 1, wherein the DL and UL subframes of the TDD frame in one resource slot are allocated to different RBMs.

3. The method of claim 1, wherein each HM serves a single RBM in each DL subframe per carrier.

4. The method of claim 1, wherein, for multi-beam operation, each HM serves a single RBM in each DL subframe per carrier per antenna beam.

5. The method of claim 1, wherein each HM serves a single RBM in each UL subframe per carrier.

6. The method of claim 1, wherein, for multi-beam operation, each HM serves a single RBM in each UL subframe per carrier per antenna beam.

7. The method of claim 1, wherein each resource slot comprises a 1 ms TDD frame.

8. The method of claim 1, further comprising for ranging, transmitting a ranging frame wherein the DL subframe carries general information and the UL subframe carries a ranging opportunity.

9. The method of claim 1, wherein each HM stores an independent context for each of its served RBMs, comprising a record with the operational state and performance of each RBM.

10. The method of claim 1, wherein RBMs not scheduled in the current resource slot continue to receive PHY control channel signaling from their serving HM, and RBMs update their parameters or links accordingly.

11. The method of claim 1, wherein RBMs not scheduled in the current resource slot monitor radio frequency (RF) environment characteristics and update their parameters and states accordingly.

12. A non-transitory computer readable storage medium storing reported data and storing programming instructions for execution by one or more processing units of nodes of a fixed wireless backhaul network comprising a plurality of Hub Modules (HM) and Remote Backhaul Modules (RBM) having directional antenna and deployed as fixed nodes, wherein each Hub site comprises at least one HM, and each HM serves a set of the RBMs through hub-RBM radio links, said programming instructions implementing, in one or more of said processing units, the method of claim 1.

13. The method of claim 1 wherein the destination RBM for the DL subframe is the same RBM as the source RBM for the UL subframe.

14. A system in a fixed wireless backhaul network comprising a plurality of Hub Modules (HM) and Remote Backhaul Modules (RBM) having directional antenna and deployed as fixed nodes, and a centralized server configured for coordinating system level processes, wherein each hub-site comprises at least one HM, and each HM serves a set of the RBMs through Hub-RBM radio links, and wherein each HM and RBM comprises data storage and a processing unit configured for implementing a method of signaling for Point-to-Multi-Point (PtMP) transmission, wherein each HM serves one RBM in each resource slot in Time Division Multiple Access (TDMA) mode, and comprising, in each resource slot, transmitting a Time Division Duplex (TDD) frame comprising one Downlink (DL) subframe wherein a HM transmits, one UpLink (UL) subframe wherein an RBM transmits and gaps necessary to switch the radio receive/transmit (RX/TX) direction and accommodate a round-trip delay; and wherein each subframe carries a control channel that completely describes that subframe and specifies a single destination RBM for the DL subframe and a single source RBM for the UL subframe.

15. A system according to claim 14, wherein the centralized server is configured for coordinating system level processes comprising coordinated beam selection, power control, and carrier assignment.

* * * * *